US009692480B2

(12) United States Patent
Wang et al.

(10) Patent No.: US 9,692,480 B2
(45) Date of Patent: Jun. 27, 2017

(54) METHOD AND APPARATUS FOR COORDINATING A CELL ON A PLURALITY OF RESOURCE BLOCKS

(71) Applicant: NTT DoCoMo, Inc., Chiyoda-ku, Tokyo (JP)

(72) Inventors: Jing Wang, Beijing (CN); Liu Liu, Beijing (CN); Huiling Jiang, Beijing (CN); Kazuaki Takeda, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 128 days.

(21) Appl. No.: 14/525,837

(22) Filed: Oct. 28, 2014

(65) Prior Publication Data

US 2015/0117394 A1 Apr. 30, 2015

(30) Foreign Application Priority Data

Oct. 31, 2013 (CN) .......................... 2013 1 0532622

(51) Int. Cl.
*H04B 1/66* (2006.01)
*H04B 7/024* (2017.01)
(Continued)

(52) U.S. Cl.
CPC ............. *H04B 1/662* (2013.01); *H04B 7/024* (2013.01); *H04B 7/0632* (2013.01); *H04W 16/06* (2013.01); *H04W 72/082* (2013.01)

(58) Field of Classification Search
CPC ...... H04B 1/662; H04B 7/024; H04B 7/0673; H04B 1/0475; H04W 72/082; H04W 24/10
(Continued)

(56) References Cited

U.S. PATENT DOCUMENTS

2013/0107798 A1 5/2013 Gao et al.
2013/0121191 A1* 5/2013 Song .................... H04J 11/0056
370/252
(Continued)

FOREIGN PATENT DOCUMENTS

WO 2013/008794 1/2013
WO 2013/099218 7/2013

OTHER PUBLICATIONS

ZTE: "CoMP Phase 2 JP Evaluation Results", 3GPP TSG-RAN WG1 #66, Athens, Greece, Aug. 22-26, 2011, 4 pages.
(Continued)

*Primary Examiner* — Jamal Javaid
(74) *Attorney, Agent, or Firm* — Harness, Dickey & Pierce, P.L.C.

(57) ABSTRACT

A method and an apparatus for coordinating a cell on a plurality of resource blocks, and a method for selecting, by a central control device, a mode for coordinating a cell on a plurality of resource blocks in a communication system including a base station and the central control device are disclosed. The method for coordinating a cell comprises: determining whether the cell needs to be muted on at least one resource block; determining a ratio of the resource block on which the cell is muted to the plurality of resource blocks, in a case where the cell needs to be muted on the at least one resource block; and determining, based on the ratio, the resource block on which the cell is muted among the plurality of resource blocks, the resource block being a time resource block, a frequency resource block or a time-frequency resource block.

18 Claims, 5 Drawing Sheets

(51) Int. Cl.
*H04W 16/06* (2009.01)
*H04B 7/06* (2006.01)
*H04W 72/08* (2009.01)

(58) Field of Classification Search
USPC .................. 370/336, 252, 330, 329, 331
See application file for complete search history.

(56) References Cited

U.S. PATENT DOCUMENTS

| | | | |
|---|---|---|---|
| 2013/0272274 A1 | 10/2013 | Ishida et al. | |
| 2014/0169275 A1 | 6/2014 | Nagata et al. | |
| 2014/0187255 A1* | 7/2014 | Dimou | H04W 72/082 455/452.2 |

OTHER PUBLICATIONS

Partial Search Report in corresponding EP Application 14190705.5 dated Mar. 11, 2015, 7 pages.
Extended Search Report in corresponding EP Application 14190705.5 dated Jul. 24, 2015, 13 pages.

\* cited by examiner

METHOD AND APPARATUS FOR COORDINATING A CELL ON A PLURALITY OF RESOURCE BLOCKS

CROSS-REFERENCE TO RELATED APPLICATIONS

This application claims priority to Chinese Patent Application No. 201310532622.4 with a title of "METHOD AND APPARATUS FOR COORDINATING A CELL ON A PLURALITY OF RESOURCE BLOCKS" filed with the Chinese Patent Office on Oct. 31, 2013, the entire contents of which are being incorporated herein by reference.

TECHNICAL FIELD

The present disclosure relates to a Coordinated Multi-Point (CoMP) technology, and more particularly, to a method and an apparatus for coordinating a cell on a plurality of resource blocks.

BACKGROUND

In 3rd Generation Partnership Project (3GPP) Release 11, it has been proved that the CoMP technology can significantly improve system performance. In the CoMP technology, a plurality of cells (or base stations corresponding to the cells) including a serving cell and neighbor cells of the serving cell transmit/receive signals to/from users (interchangeably used with user equipments (UEs) hereinafter) in a coordinated manner in order to reduce inter-cell interference and improve received signal qualities of the base stations/users, and thereby improving a throughput of a communication system. To this end, it is necessary to perform coordination among the plurality of cells.

On the other hand, a CoMP system in a centralized radio access network (C-RAN) architecture has been proposed. FIG. 1 shows a schematic diagram of such a system. As shown in FIG. 1, a central control device and a plurality of remote radio heads (RRH) (three RRHs are shown exemplarily in FIG. 1) connected with the central control device form a base station of the CoMP system, each RRH forms a cell, and the cells constituting a cooperating set. There may be one or more UEs in each cell, including a CoMP UE (e.g., a UE located in a center of the cell) and a non-CoMP UE (e.g., a UE located on an edge of the cell).

In the CoMP system shown in FIG. 1, currently a short-term-information-based centralized scheduling (ST-CS) method is mainly adopted to perform coordination among the respective cells in the cooperating set and schedule users in the respective cells. FIG. 2 schematically shows a first ST-CS method. As shown in FIG. 2, the UE measures a reference signal reception power (RSRP) (or a reference signal reception quality (RSRQ)) transmitted by the base station of the cell and a channel state (i.e., an instant channel state or a short-term channel state) of a radio channel between the UE and the base station in step S201, and reports the RSRP (or the RSRQ) and instant channel state information (CSI) indicating the channel state to the base station in step S202. In step S203, the base station transmits the RSRP (or the RSRQ) and the instant CSI to the central control device. In step S204, the central control device performs joint scheduling based on the above information transmitted by the base station to determine a muting state of the cell on each sub-band, and performs scheduling of the users (including allocation of resources to the users and selection of modulation and coding scheme (MCS) levels for the users) on each sub-band for the cell. In step S205, the central control device notifies each cell of the muting states of the cell on the respective sub-bands and a user scheduling result for the cell. In step S206, the base station operates based on the notified muting states and the user scheduling result. In step S207, the base station notifies the UE of measurement configuration information for instructing the UE to measure the CSI.

FIG. 3 schematically shows a second ST-CS method, in which steps S301 to S303 and step S307 are the same as steps S201 to S203 and S207 respectively. In step S304, the central control device performs joint scheduling to determine a muting state of each cell on each sub-band, and notifies each cell of the muting state of the cell on each sub-band in step S305. In step S306, the base station performs scheduling of users independently (including allocation of resources to the users and selection of MCS levels) based on the notified muting state.

A system performance gain obtained by using the above ST-CS methods is closely related to a transmission delay on a line between the base station and the central control device (i.e., a backhaul line). In the ST-CS method shown in FIG. 2, if the transmission delay on the line between the base station and the central control device is too large, the instant CSI information transmitted in step S203 will become outdated information when reaching the central control device, so that the result of the joint scheduling performed based on the instant CSI information in step S204 does not match the channel state at that time any more; furthermore, since the scheduling of the users is performed in the central control device and then the scheduling result is notified to the base station, if the transmission delay on the line between the base station and the central control device is too large, the scheduling result will also become outdated scheduling result when reaching the base station, so that the scheduling result does not match the channel state at that time, either. In the ST-CS method shown in FIG. 3, there is a problem in step S303 which is the same as that in the first method; in addition, although the scheduling of the users is not performed in the central control device any more, which avoids the problem that the transmission delay causes the outdated scheduling result, it is impossible to obtain a good scheduling result because states of neighbor cells are not taken into consideration when the scheduling of the users is performed in the base station.

Therefore, there is a need for a new cell coordination method, which can mitigate or avoid an impact of the transmission delay of the line between the base station and the central control device on the cell coordination result and the user scheduling result.

SUMMARY

The present disclosure is proposed in view of the above problems. An object of the present disclosure is to provide a method and an apparatus for coordinating a cell on a plurality of resource blocks, which, in a case where a plurality of cells are deployed, can reduce inter-cell interference significantly, and in the meantime, even if a transmission delay on a line between a base station and a central control device is relatively large, can still obtain a good cell coordination result and a good user scheduling result, thereby improve a performance of a communication system.

According to an aspect of the present disclosure, there is provided a method for coordinating a cell on a plurality of resource blocks, the cell forming a cluster with at least one other cell, the method comprising: determining whether the cell needs to be muted on at least one resource block; determining a ratio of the resource block on which the cell is muted to the plurality of resource blocks, in a case where the cell needs to be muted on the at least one resource block; and determining, based on the ratio, the resource block on which the cell is muted among the plurality of resource blocks, the resource block being a time resource block, a frequency resource block or a time-frequency resource block.

According to another aspect of the present disclosure, there is provided an apparatus for coordinating a cell on a plurality of resource blocks, the cell forming a cluster with at least one other cell, the apparatus comprising: a muting determining device, configured to determine whether the cell needs to be muted on at least one resource block; a muting ratio determining device, configured to determine a ratio of the resource block on which the cell is muted to the plurality of resource blocks, in a case where the cell needs to be muted on the at least one resource block; and a muting mode determining device, configured to determine, based on the ratio, the resource block on which the cell is muted among the plurality of resource blocks, the resource block being a time resource block, a frequency resource block or a time-frequency resource block.

According to another aspect of the present disclosure, there is provided a method for selecting, by a central control device, a mode of coordinating a cell on a plurality of resource blocks in a communication system including a base station and the central control device, comprising: determining a transmission delay on a line between the base station and the central control device; and coordinating the cell on the plurality of resource blocks in a first mode when the transmission delay is not less than a predetermined threshold value, and coordinating the cell on the plurality of resource blocks in a second mode when the transmission delay is less than the predetermined threshold value, wherein in the first mode, it is determined whether the cell needs to be muted on at least one resource block, a ratio of the resource block on which the cell is muted to the plurality of resource blocks is determined in a case where the cell needs to be muted on the at least one resource block, and the resource block on which the cell is muted among the plurality of resource blocks is determined based on the ratio, and wherein in the second mode, muting states of the cell on the plurality of resource blocks are decided by joint scheduling based on channel state information indicating channel states between users of the cell and the base station which is received from the base station.

With the method and the apparatus for coordinating a cell according to the above aspects of the present disclosure, in the case where a plurality of cells are employed, these cells can be coordinated on the respective resource blocks, so that a cell which imparts large interference on users of other cells may be muted on the resource blocks, so that inter-cell interference may be reduced effectively. In addition, as described below, even if the transmission delay on the line between the base station and the central control device is relatively large, the above method and apparatus can obtain a good cell coordination result and a good user scheduling result, and thereby improve a performance of the communication system.

BRIEF DESCRIPTION OF THE DRAWINGS

The above and other objects, features and advantages of the present disclosure will become more apparent through a detailed description of embodiments of the present disclosure in conjunction with the accompanying drawings, where.

DETAILED DESCRIPTION

With reference now to the accompanying drawings, a method and an apparatus for coordinating a cell on a plurality of resource blocks according to embodiments of the present disclosure will be described below. The method and the apparatus can be applied to a CoMP system in a C-RAN architecture shown in FIG. 1, and can also be applied to a wireless communication system in other architectures including a base station and a central control device, and the method and the apparatus can be implemented by the central control device. The central control device may be included in the base station, or may be arranged outside the base station and be communicatively coupled to the base station. Like reference numbers represent like elements throughout the drawings. It is to be understood that the embodiments described herein are merely illustrative, and should not be construed as limiting the scope of the invention.

First of all, the method for coordinating a cell on a plurality of resource blocks according to the embodiment of the present disclosure is described with reference to FIG. 4.

Figure 1:
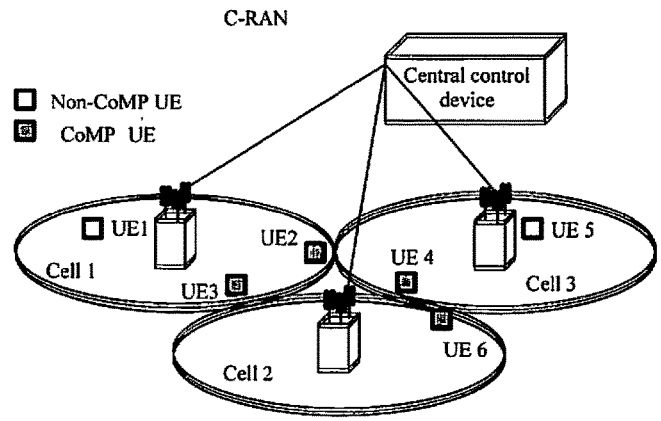
FIG. 1 schematically shows a CoMP system in a C-RAN architecture.

In the embodiments of the present disclosure, the cell may be a small-sized cell, for example, a small cell, a micro cell, a pico cell, etc., or may be another type of cell except the small cell, for example, another type of small-sized cell or a macro cell, etc. As shown in FIG. 1, the cell may be deployed in a certain region together with at least one other cell, thereby form a cluster (or referred to as a cell group). In this case, the above coordinating method may be performed on each cell. Hereinafter, the embodiments of the present disclosure are described by taking Cell 1 shown in FIG. 1 as an example for convenience, Cell 1 may form a cluster with Cells 2 and 3, and the descriptions are also applicable to other cells in the cluster. Further, in the embodiments of the present disclosure, the resource block may be a time resource block, for example, a sub-frame or another type of time-domain resource block (e.g., a frame) which can be used as a basic unit for cell coordination, may be a frequency resource block, for example, a sub-band or another type of frequency resource block (e.g., a frequency band) which can be used as a basic unit for cell coordination, or may be a time-frequency resource block, e.g., a sub-frame-sub-band resource block.

In step S401, it is determined whether Cell 1 needs to be muted on at least one resource block.

As described above, in the case that a plurality of cells are deployed, inter-cell coordination is performed on the respective cells on the respective resource blocks in order to reduce interference among the cells, that is, some cell(s) is/are selectively muted on some resource blocks to reduce interference imparted on other cells. To this end, it is necessary to determine which cell(s) need to be muted. In other words, it may be determined whether each cell in the cluster needs to be muted on at least one resource block. Here, this determination can be performed according to whether Cell 1 has a victim cell. The victim cell refers to a cell in the cluster which suffers large interference from Cell 1. When there is the victim cell, Cell 1 may be muted in order to reduce the interference from Cell 1 to the victim cell, and when there is no victim cell, Cell 1 may not be muted because the interference from Cell 1 to other cells is not large.

It may be determined whether Cell 1 has the victim cell in a variety of manners. In a first manner, it may be determined whether Cell 1 has the victim cell according to whether the interference from Cell 1 to users in other cells (e.g., Cells 2 and 3) in the cluster exceeds a predetermined level, so as to determine whether Cell 1 needs to be muted on at least one resource block. For example, a user (e.g., an edge user) of Cell 2 may measure a reference signal reception power (RSRP) of a serving cell of the user (i.e. Cell 2) and a RSRP of Cell 1. Then, a difference between the two RSRPs can be calculated, and it may be determined whether the difference is greater than a predetermined threshold value to determine whether the interference from Cell 1 to the user in Cell 2 exceeds a predetermined level. The threshold value may be set appropriately according to design needs and/or actual situations of the mobile communication network, and typically may be set to 6 dB. If the difference is less than the threshold value, it may be considered that Cell 1 imparts large interference on Cell 2, that is, the interference from Cell 1 to the user in Cell 2 exceeds the predetermined level, then it can be determined that Cell 2 is the victim cell of Cell 1. Conversely, if the difference is greater than the threshold value, this shows that the interference from Cell 1 to the user in Cell 2 does not exceed the predetermined level, therefore Cell 2 is not the victim cell of Cell 1. Similarly, a user of Cell 3 may measure a RSRP of a serving cell thereof (i.e. Cell 3) and a RSRP of Cell 1, and it may be determined whether Cell 3 is the victim cell of Cell 1 in the manner described above. It is to be appreciated that although the victim cell of Cell 1 is determined by using the RSRP in the above, the victim cell of Cell 1 may also be determined by other parameters (e.g., a reference signal reception quality (RSRQ), a signal to interference plus noise ratio (SINR), etc.) in a similar manner.

In a second manner, it may be determined whether Cell 1 has the victim cell according to whether distances between Cell 1 and other cells in the cluster are less than a predetermined threshold value. For example, if a distance between a base station of Cell 1 and a base station of Cell 2 is less than the predetermined threshold value, this shows that the two cells are near to each other, and Cell 1 may impart large interference on Cell 2, thus Cell 2 may be determined to be the victim cell of Cell 1, meanwhile Cell 1 is a victim cell of Cell 2. Conversely, if the distance between the base station of Cell 1 and the base station of Cell 2 is greater than the predetermined threshold value, this shows that the two cells are far from each other, and Cell 1 may not impart large interference on Cell 2, therefore Cell 2 may not be determined to be the victim cell of Cell 1, meanwhile Cell 1 is not the victim cell of Cell 2, either. Similarly, the above determination operation may be performed on other cells in the cluster, so as to determine whether they are victim cells of Cell 1. The threshold value may be set appropriately according to design needs and/or actual situations of the mobile communication network, and typically may be set to 6 dB. Alternatively, the distance may be replaced with a path loss, that is, it may be determined whether Cell 1 has the victim cell according to whether path losses between Cell 1 and other cells in the cluster are less than a predetermined threshold value. Of course, other parameters, in addition to the path loss, may be used to determine whether Cell 1 has the victim cell.

In addition, an interference pool may be established for each cell in the cluster, to record a victim cell and an interference-source cell of the cell. The interference pool may be implemented as a file in any suitable format, for example, a table or the like. For example, if the victim cells of Cell 1 are Cell 2 and Cell 3, information indicating Cell 2 and Cell 3, e.g., IDs of Cell 2 and Cell 3, may be recorded in the interference pool of Cell 1. Furthermore, since the coordinating method according to the embodiment of the present disclosure may be performed on each cell in the cluster, so that the operation of determining the victim cell may be performed on each cell in the cluster, it can be known whether Cell 1 is a victim cell of other cells through the determination operations of the other cells, accordingly, information of a cell which makes Cell 1 become a victim cell i.e., information of an interference-source cell of Cell 1, may also be recorded in the interference pool of Cell 1.

Figure 4:
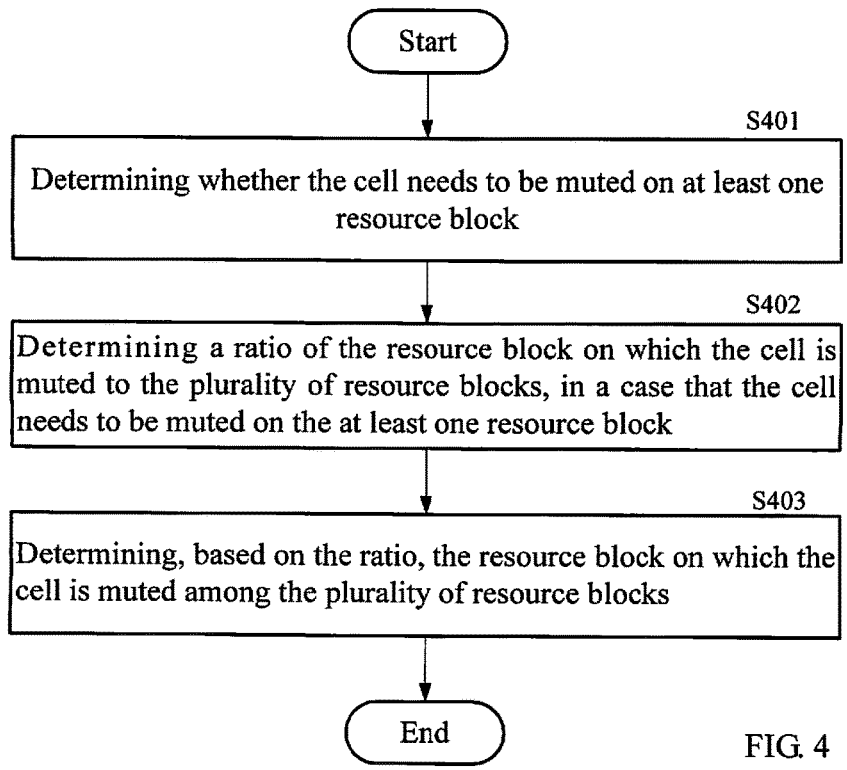
FIG. 4 shows a flowchart of a method for coordinating a cell on a plurality of resource blocks according to an embodiment of the present disclosure.

With further reference to FIG. 4, in step S402, in a case where Cell 1 needs to be muted on the at least one resource block, a ratio of the resource block on which Cell 1 is muted to the plurality of resource blocks, i.e., a muting ratio of Cell 1 (hereinafter expressed as $r_{cell1}$), may be determined.

Specifically, the muting ratio $r_{cell1}$ may be determined according to a load of Cell 1, so that the higher the load of Cell 1 is, the lower the muting ratio $r_{cell1}$ is. The load of Cell 1 may be measured by a resource usage rate or a number of users of Cell 1. In this case, the central control device may receive, from the base station of Cell 1, information indicating the load of Cell 1, for example, information indicating the resource usage rate or the number of users.

In a case where the load of Cell 1 is expressed by the resource usage rate of Cell 1, the load of Cell 1 may be expressed by an average resource (e.g., a time-domain resource, a frequency-domain resource, or a power resource) usage rate of Cell 1 over a predetermined time period (hereinafter expressed as $RU_{avg\text{-}cell1}$), where the predetermined time period may be set appropriately as required.

In an implementation, the muting ratio may be determined according to only the $RU_{avg\text{-}cell1}$ of Cell 1. This is based on the following understanding: if the $RU_{avg\text{-}cell1}$ is high, this shows that the load of Cell 1 is high, therefore it should be avoided to mute Cell 1 on too many resource blocks in order to reduce an impact on a performance of Cell 1; conversely, if the $RU_{avg\text{-}cell}$ is low, this shows that the load of Cell 1 is low, therefore Cell 1 can be muted on many resource blocks without significantly affecting its performance. Specifically, a maximum ratio $r_{max\text{-}cell1}$ of the resource block on which Cell 1 is muted to the plurality of resource blocks may be calculated by using, for example, formula (1) below:

$$r_{max-cell1}=1-a_1*RU_{avg-cell1} \qquad (1)$$

where $a_1$ is a constant selected as actually required, e.g., 1 or 1.5, etc.

Then, the muting ratio $r_{cell1}$ of Cell 1 may be set to a value equal to the maximum ratio $r_{max-cell1}$, a value slightly smaller than the maximum ratio $r_{max-cell1}$, or any value between 0 and the maximum ratio $r_{max-cell1}$. It is to be appreciated that the above formula (1) is merely exemplary, and the maximum ratio $r_{max-cell1}$ can also be calculated by using other formulae which are based on the average resource usage rate, and so as to further determine the muting ratio $r_{cell1}$. For example, according to the actual situations of the system, the maximum ratio $r_{max-cell1}$ can also be calculated at least by using formula (2) or (3) below:

$$r_{max-cell1}=1-a_2*(RU_{avg-cell1})^2 \qquad (2)$$

$$r_{max-cell1} = 1 - a_3^* \sqrt{RU_{avg-cell1}} \qquad (3)$$

where $a_2$ and $a_3$ are constants selected as actually required.

In another implementation, the muting ratio of Cell 1 may be determined according to a relative magnitude between the average resource usage rate of Cell 1 in a predetermined time period ($RU_{avg-cell1}$) and an average resource usage rate of a part or all of the cells in the cluster in the predetermined time period ($RU_{avg-cluster}$) Here, the part of the cells in the cluster may be cells interfering with Cell 1, cells having short distance from Cell 1 (e.g., cells having distances less than a certain threshold value from Cell 1), or a part of cells selected from all the cells in the cluster according to any other criteria. Such an implementation is based on the following understanding: if the average resource usage rate of Cell 1 is equal to or higher than the average resource usage rate of the part or all of the cells in the cluster, this shows that the load of Cell 1 has already been equal to or higher than an average load of the part or all of the cells in the cluster, therefore, Cell 1 may not be muted to avoid impact on its performance; conversely, if the average resource usage rate of Cell 1 is lower than the average resource usage rate of the part or all of the cells in the cluster, this shows that the load of Cell 1 is lower than the average load of the part or all of the cells in the cluster, therefore, Cell 1 may be muted on an appropriate number of subframes to reduce the interference from the cell to other cells. Specifically, the maximum ratio $r_{max-cell1}$ of the resource block on which Cell 1 is muted to the plurality of resource blocks may be calculated by using, for example, formula (4) below:

$$r_{max-cell1}=1-a_4*RU_{avg-cell1}/RU_{avg-cluster} \qquad (4)$$

where $a_4$ is a constant as actually required, e.g., 1 or 1.5, etc.

Then, the muting ratio $r_{cell1}$ of Cell 1 may be set to a value equal to the maximum ratio $r_{max-cell1}$, a value slightly smaller than the maximum ratio $r_{max-cell1}$, or any value between 0 and the maximum ratio $r_{max-cell1}$, where when $r_{max-cell1}$ calculated according to formula (4) is negative or 0, the muting ratio $r_{cell1}$ is set to 0, i.e., Cell 1 is not muted. It is to be appreciated that the above formula (4) is merely exemplary, and the maximum ratio $r_{max-cell1}$ can also be calculated by using other formulae which are based on the relative magnitude between the average resource usage rate of Cell 1 in the predetermined time period and the average resource usage rate of the part or all of the cells in the cluster in the predetermined time period, to further determine the muting ratio $r_{cell1}$. For example, according to the actual situations of the system, the maximum ratio $r_{max-cell1}$ can also be calculated at least by using formula (5) or (6) below:

$$r_{max-cell1}=1-a_5*(RU_{avg-cell1}/RU_{avg-cluster})^2 \qquad (5)$$

$$r_{max-cell1} = 1 - a_6^* \sqrt{RU_{avg-cell1}/RU_{avg-cluster}} \qquad (6)$$

where $a_5$ and $a_6$ are constants selected as actually required.

Alternatively, in a case where the load of Cell 1 is expressed by the number of users of Cell 1, the muting ratio $r_{cell1}$ of Cell 1 may be determined according to an average number of users of Cell 1 in a predetermined time period. Specifically, the muting ratio $r_{cell1}$ may be determined according to a relative magnitude between the average number of users in Cell 1 in the predetermined time period (hereinafter expressed as $N_{avg-cell1}$) and an average number of users in a part or all of the cells in the cluster in the predetermined time period (hereinafter expressed as $N_{avg-cluster}$). Likewise, the part of the cells in the cluster discussed herein may be cells interfering with Cell 1, cells having short distances from Cell 1, or a part of cells selected from all the cells in the cluster according to any other criteria. Such an alternative implementation is based on the following understanding: if the average number of users in Cell 1 is equal to or higher than the average number of users in the part or all of the cells in the cluster, this shows that Cell 1 need to serve many users, therefore Cell 1 may not be muted to avoid impact on its performance; conversely, if the average number of users in Cell 1 is lower than the average number of users in the part or all of the cells in the cluster, this shows that Cell 1 needs to serve a few users, therefore Cell 1 may be muted on an appropriate number of subframes to reduce interference from the cell to other cells. Specifically, the maximum ratio $r_{max-cell1}$ of the resource block on which Cell 1 is muted to the plurality of resource blocks may be calculated by using, for example, formula (7) below:

$$r_{max-cell1}=1-a_7*N_{avg-cell1}/N_{avg-cluster} \qquad (7)$$

where $a_7$ is a constant as actually required, e.g., 1 or 1.5, etc.

Then, the muting ratio $r_{cell1}$ of Cell 1 may be set to a value equal to the maximum ratio $r_{max-cell1}$, a value slightly smaller than the maximum ratio $r_{max-cell1}$, or any value between 0 and the maximum ratio $r_{max-cell1}$, where when $r_{max-cell1}$ calculated according to formula (7) is negative or 0, the muting ratio $r_{cell1}$ is set to 0, i.e., Cell 1 is not muted. Likewise, the above formula (7) is merely exemplary, and the maximum ratio $r_{max-cell1}$ can also be calculated by using other formulae which are based on the relative magnitude between the average number of users in Cell 1 in the predetermined time period and the average number of users in the part or all of the cells in the cluster in the predetermined time period, to further determine the muting ratio $r_{cell1}$.

It is to be noted that there may be a case where it is determined in step S401 that Cell 1 needs to be muted on at least one resource block, whereas the muting ratio $r_{cell1}$ determined according to one of the above formulae (4)-(7) is 0 ($r_{max-cell1}$ is 0 or negative). In this case, Cell 1 may not be muted as described above. In addition, it is to be noted herein that, muting Cell 1 on a certain resource block may mean that Cell 1 is muted completely on the resource block, or may mean that Cell 1 does not transmit data on the resource block, and only transmits a signaling necessary for maintaining a connection.

With further reference to FIG. 4, in step S403, the resource block on which Cell 1 is muted (i.e., the muted resource block of Cell 1) among the plurality of resource blocks may be determined based on the muting ratio of Cell 1 determined in step S402, that is, it is determined on which of the plurality of resource block(s) Cell 1 is muted, i.e. a muting mode of Cell 1 is determined.

Specifically, firstly, a number of muted cells for each resource block among the plurality of resource blocks may be determined, where the number of muted cells for each resource block refers to a number of cells which are muted on the resource block and which are included in the interference pool of Cell 1. As described above, the interference pool of Cell 1 includes the interfering cell that imparts the interference on Cell 1 and the victim cell that suffers the interference from Cell 1. Then, a number of resource blocks corresponding to the muting ratio may be selected from the plurality of resource blocks in a descending order of the numbers of muted cells for the respective resource blocks, as resource blocks on which Cell 1 is not muted (i.e., transmitting resource blocks of Cell 1), thereby the remaining resource blocks may be determined as the resource blocks on which Cell 1 is muted.

Next, detailed operations of step S403 will be described in conjunction with specific examples.

Figure 5:
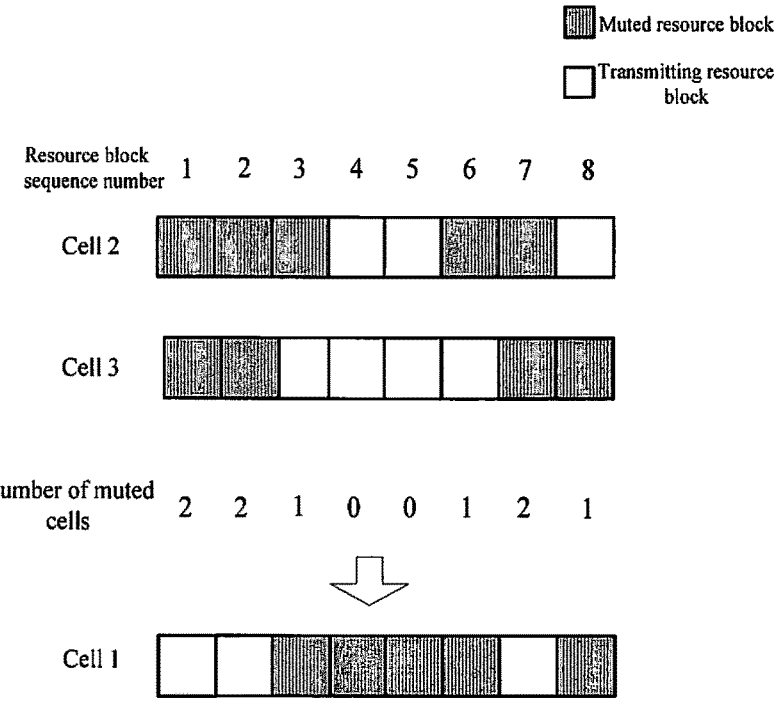
FIG. 5 shows a schematic diagram of a first example of determining a muted resource block for Cell 1.

In a first example, the resource block is a frequency resource block (e.g., a sub-band) or a time resource block (e.g., a sub-frame). It is assumed that Cell 2 and Cell 3 are recorded in the interference pool of Cell 1, and there are eight resource blocks in total. Further, it is assumed that the muting ratios of Cell 2 and Cell 3 and their muting modes on the eight resource blocks have been determined in advance as shown in FIG. 5. Firstly, a number of muted cells for each resource block among the eight resource blocks, i.e., a number of Cell 2 and/or Cell 3 that are muted on each resource block, can be determined. As shown in FIG. 5, Cell 2 is muted on resource blocks 1-3, 6 and 7 respectively, and Cell 3 is muted on resource blocks 3-6 respectively, therefore the numbers of muted cells for resource blocks 1-8 are 2, 2, 1, 0, 0, 1, 2 and 1 respectively. Then, a number of resource blocks corresponding to the muting ratio may be selected from resource blocks 1-8 in a descending order of the numbers of muted cells for resource blocks 1-8, as the transmitting resource blocks of Cell 1, thereby the remaining resource blocks may be determined as the muted resource blocks of Cell 1. Here, it is assumed that the muting ratio of Cell 1 is 3/8, then three resource blocks are selected from the eight source blocks as the muted resource blocks of Cell 1. Thus, resource blocks 1, 2 and 7 may be selected in sequence in the descending order of the numbers of muted cells, as the transmitting resource blocks of Cell 1, then the remaining resource blocks 3-6 and 8 are determined as the muted resource blocks of Cell 1.

It may be noted that, there may be at least two resource blocks having the same number of muted cells among the plurality of resource blocks. For example, in FIG. 5, the numbers of muted cells for resource blocks 1, 2 and 7 are all 2, the numbers of muted cells for resource blocks 3, 6 and 8 are all 1, and the numbers of muted cells for resource blocks 4 and 5 are both 0. When the muting ratio of Cell 1 is some values, it may be necessary to select at least one resource block from the resource blocks having the same number of muted cells, as the transmitting resource block of Cell 1. For example, when the muting ratio of Cell 1 is 4/8, it is necessary to select four resource blocks from the eight resource blocks as the transmitting resource blocks of Cell 1. At this time, after three resource blocks 1, 2 and 7 having the largest numbers of muted cells are selected from the eight resource blocks as the transmitting resource blocks of Cell 1, it is necessary to select one resource block from resource blocks 3, 6 and 8 having the same number of muted cells as a fourth transmitting resource block of Cell 1.

Figure 6:
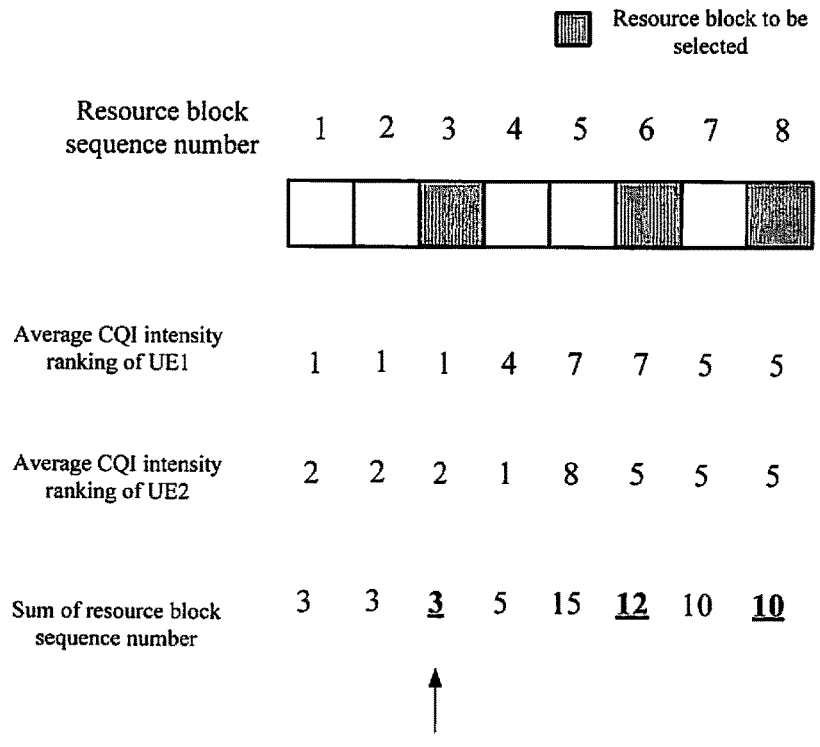
FIG. 6 shows a schematic diagram of a method for selecting at least one resource block when at least two resource blocks have a same number of muted cells.
Figure 7:
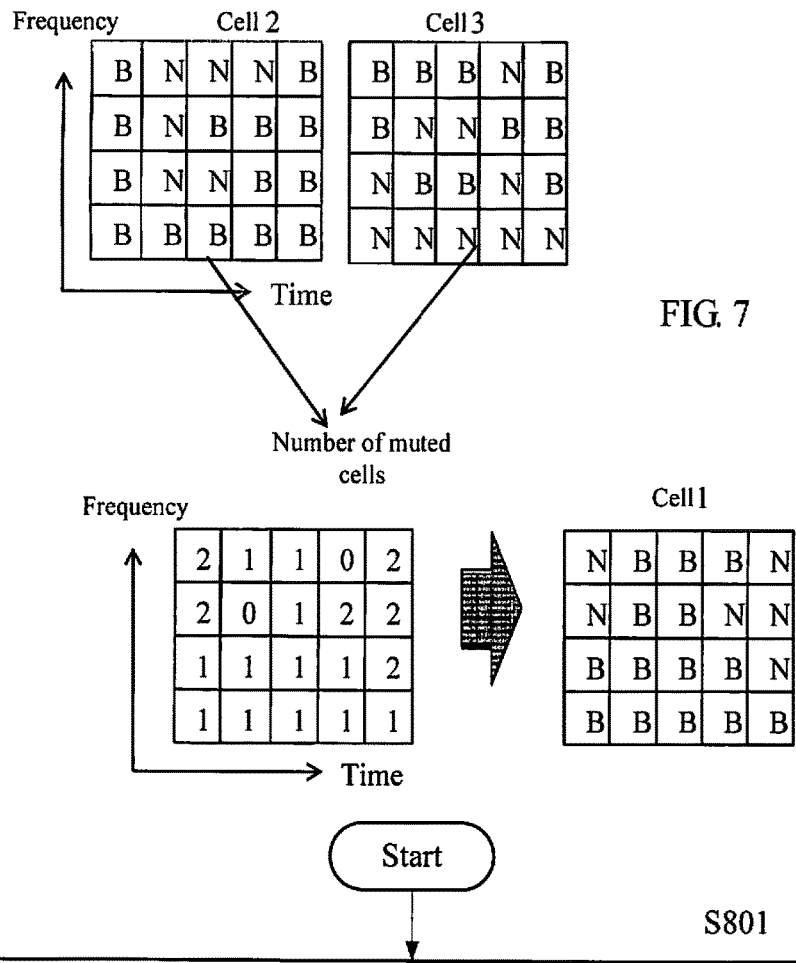
FIG. 7 shows a schematic diagram of a second example of determining a muted resource block for Cell 1.

In the embodiment of the present disclosure, when the case where there are at least two resource blocks having the same number of muted cells occurs, at least one resource block may be selected arbitrarily or randomly from the at least two resource blocks having the same number of muted cells, as a transmitting resource block of Cell 1. Alternatively, at least one resource block may be selected from the at least two resource blocks according to intensities of average channel state information of a user of Cell 1 on the at least two resource blocks respectively, as the transmitting resource block of Cell 1. Specifically, for each resource block, each user of Cell 1 may measure a channel state of a radio channel between the user and the base station of Cell 1 (i.e., the serving cell of the user), and transmits channel state information (CSI) indicating the channel state (e.g., a channel quality indicator (CQI)) to the base station. The base station may calculate, for each resource block, the average CSI of each user of Cell 1 in a predetermined time period, and then reports the average CSI to the central control device. In the central control device, respective resource blocks may be ranked for each user according to intensities of the average CSI of the user on the respective resource blocks, where the greater the intensity of the average CSI corresponding to the resource block is, the smaller a sequence number of the resource block is, and two resource blocks whose intensities of the average CSI are the same or have a deviation less than a predetermined value (which may be set as actually required) may have the same sequence number. Then, for each resource block, a sum of the sequence numbers of the resource block corresponding to the respective users is calculated, and at least one resource block is selected in an ascending order of the sums for the respective resource blocks, as the transmitting resource block of Cell 1. Thereby, the remaining resource blocks may be determined as the muted resource blocks of Cell 1. FIG. 6 shows an example of such a selection method. As shown in FIG. 6, it is assumed that one resource block needs to be selected from resource blocks 3, 6 and 8 shown in FIG. 5 as the transmitting resource block of Cell 1. Moreover, it is assumed that Cell 1 has two users UE1 and UE2, and that for UE1, sequence numbers of resource blocks 1-8 obtained by ranking the eight resource blocks according to the intensities of the average CSI (e.g., average CQI intensities) are sequentially 1, 1, 1, 4, 7, 7, 5 and 5, and for UE2, sequence numbers of resource blocks 1-8 obtained by ranking the eight resource blocks according to the intensities of the average CSI are sequentially 2, 2, 2, 1, 8, 5, 5 and 5. For each resource block, sums of the sequence numbers of the intensities of the average CSI of the respective users (i.e., UE1 and UE2) of Cell 1 on the resource block are calculated. Then, one resource block (resource block 3 in this example) is selected in an ascending order of the sums, as the transmitting resource block of Cell 1. It is to be noted that the above selection method is only illustrative rather than limitative, and various changes may be made thereto without departing from the scope of the invention. For example, although it is mentioned in the above that the greater the intensity of the average CSI corresponding to the resource block is, the smaller the sequence number of the resource block is, it is also possible that the greater the intensity of the average CSI corresponding to the resource block is, the greater the sequence number of the resource block is, and accordingly, the transmitting resource block may be selected in an descending order of the sequence numbers In a second example, the resource block may be a time-frequency resource block. FIG. 7 shows the example. It is assumed that Cell 2 and Cell 3 are recorded in the interference pool of Cell 1, and there are twenty time-frequency resource blocks in total. Further, it is assumed that the muting ratios of Cell 2 and Cell 3 and their muting modes on the twenty time-frequency resource blocks have been determined in advance, as shown in FIG. 7, where "B" represents that the cell is muted, and "N" represents that the cell is not muted. Firstly, a number of muted cells on each time-frequency resource block in the twenty time-frequency resource blocks may be determined, where the number of muted cells on each time-frequency resource block refers to a number of cells (in this example, Cell 2 and/or Cell 3) which are muted on the time-frequency resource block and are included in the interference pool of Cell 1. Then, a number of time-frequency resource blocks corresponding to the muting ratio may be selected from the twenty time-frequency resource blocks in the descending order of the numbers of muted cells on the respective time-frequency resource blocks 1-20 in the manner described above, as the transmitting resource blocks of Cell 1, thereby the muted time-frequency resource block of Cell 1 may be determined. Likewise, if there are at least two time-frequency resource blocks having the same number of muted cells, and it is necessary to select at least one time-frequency resource block from the at least two time-frequency resource blocks as a transmitting resource block of Cell 1, the at least one time-frequency resource block may be selected from the at least two time-frequency resource blocks arbitrarily or randomly, or according to the intensities of the average CSI of the users of Cell 1 on the at least two time-frequency resource blocks respectively in the manner described above, as the transmitting resource block of Cell 1, according.

After the muted resource block of Cell 1 is determined as described above and thereby the muting mode of the cell is determined, the central control device may notify the muting mode to Cell 1, to make it operate in this mode. Specifically, the central control device may transmit information indicating muting states of Cell 1 on the respective resource blocks to the base station of Cell 1. Based on this information, Cell 1 is muted or transmits data on the respective resource blocks.

On the resource blocks on which Cell 1 is not muted, the base station of Cell 1 needs to perform scheduling of users to determine which users these resource blocks are allocated to and determine MCS levels of the respective users. In the embodiment of the present disclosure, the base station may perform the scheduling of the users based on a variety of CSI fed back by the users of Cell 1 and muting states of neighbor cells of Cell 1 on the respective resource blocks.

Specifically, in the embodiment of the present disclosure, the central control device may notify, in addition to the muting mode of Cell 1 per se, muting modes of the neighbor cells of Cell 1 to the base station, i.e., transmit to the base station information indicating the muting states of the neighbor cells of Cell 1 on the respective resource blocks for use in the scheduling of the users. Furthermore, for the purpose of scheduling the users, a user of Cell 1 may feed back CSI reflecting radio channel situations between the user and the base station, e.g., a channel quality indicator (CQI), to the base station. In the embodiment of the present disclosure, for each resource block, a variety of CSI corresponding to different muting states of Cell 1 and the neighbor cells of Cell 1 on the resource block may be fed back from the user. For example, in a case where the cooperating set to which Cell 1 belongs includes a plurality of cells, these cells may have a variety of muting states, such as completely on, completely muted, and partly on and partly muted, for each resource block. The different muting states of Cell 1 and the neighbor cells of Cell 1 may be a part or all of these muting states. The user of Cell 1 may calculate the CSI corresponding to a part or all of these muting states, and feed back it to the base station of Cell 1. The specific method for the user to calculate the CSI corresponding to various muting states is commonly known in the art, and a detailed description thereof is omitted here. Here, the user may be an edge user of Cell 1, whereas in other embodiments, the user may be any user of Cell 1.

Then, for each resource block, CSI corresponding to the muting states of the neighbor cells of Cell 1 may be selected from the variety of CSI fed back from the user, and then based on the selected CSI, the scheduling of the user is performed, for example, the resource blocks are allocated to the user and the MCS level for the user is selected, so that the user can communicate by using the MCS level. For example, in a case where the cooperating set includes two cells (i.e., Cell 1 as the serving cell and one neighbor cell), for a certain resource block, if the muting state of Cell 1 is on and the muting state of the neighbor cell of Cell 1 is muted, CSI corresponding to the state that Cell 1 is on and the neighbor cell is muted can be selected from the variety of CSI fed back by the user to perform the scheduling. As another example, in a case where the cooperating set includes three cells (Cell 1, Cell 2 and Cell 3), for a certain resource block, if the muting state of Cell 1 is on, the muting state of the neighbor Cell 2 is on, and the muting state of the neighbor Cell 3 is muted, CSI corresponding to the state that Cell 1 is on, Cell 2 is on and Cell 3 is muted may be selected from the variety of CSI fed back by the user who is assigned to the resource block, and the user scheduling may be performed based on the CSI.

It may be seen that, in the embodiment of the present disclosure, when the cell coordination is performed, it is not necessary to report the CSI from the base station to the central control device, thus even if the transmission delay on the line between the base station and the central control device is large, the cell coordination result will not be affected. Further, since the user scheduling is performed in the base station rather than in the central control device, it is not necessary to report the user scheduling result from the central control device to the base station, therefore even if the transmission delay on the line between the base station and the central control device is large, the user scheduling performed in the base station will not be affected. Furthermore, in the embodiment of the present disclosure, the user scheduling is performed based on a variety of CSI fed back from the user and the muting states of the neighbor cells of Cell 1, this may render that the MCS level selected for the user can be better adapted to the radio channel state at the time of the scheduling, thus the performance of the entire communication system may be improved.

Figure 2:
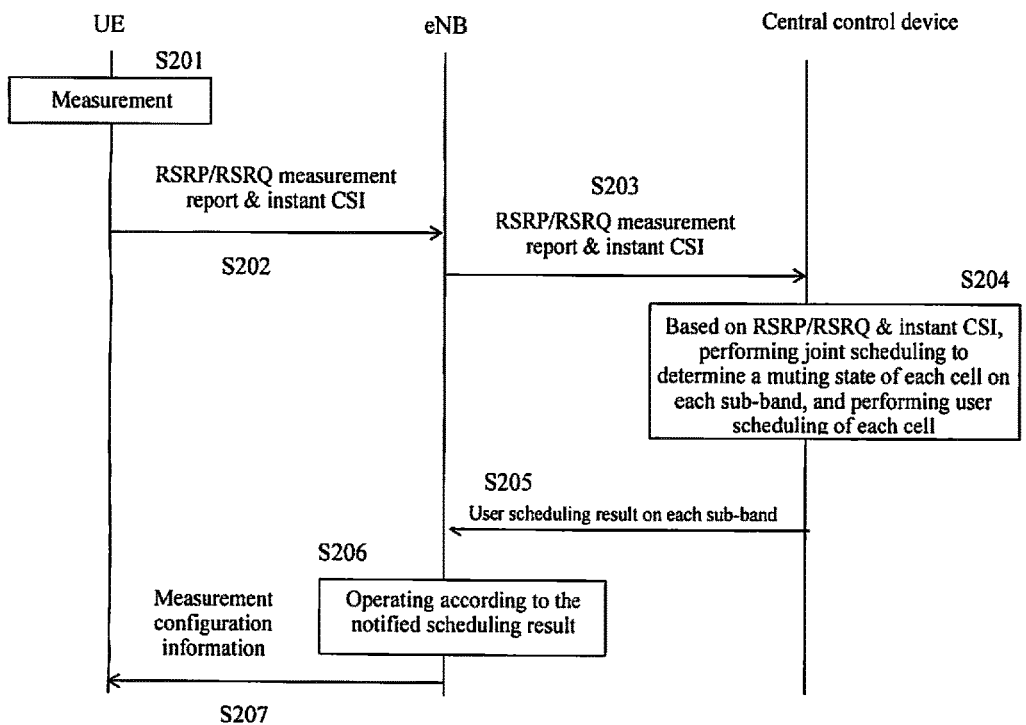
FIG. 2 schematically shows a signal flow chart of a first ST-CS method.
Figure 3:
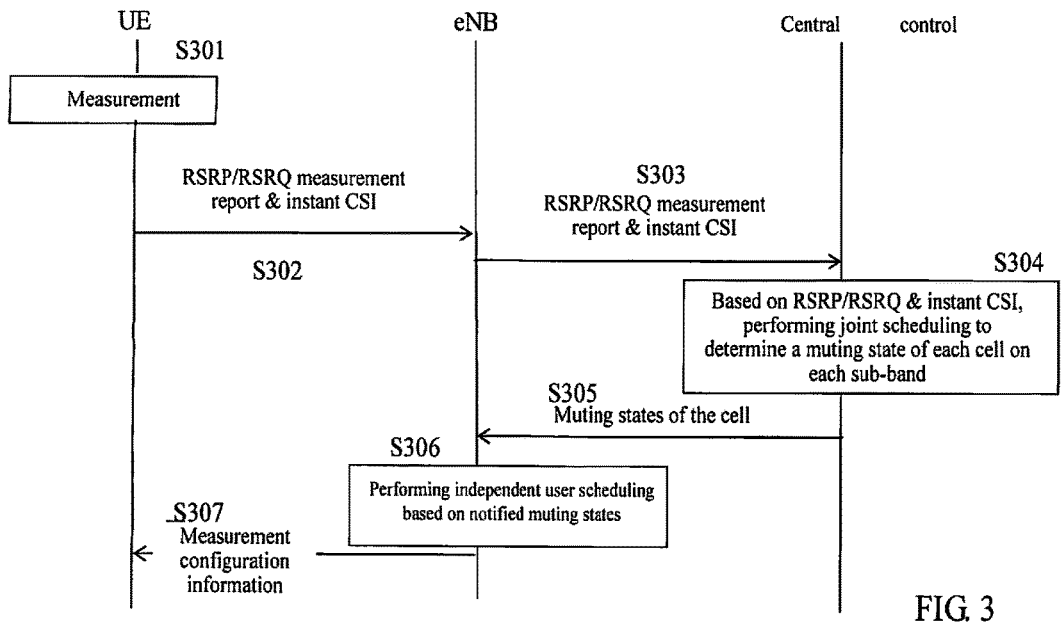
FIG. 3 schematically shows a signal flow chart of a second ST-CS method.
Figure 8:
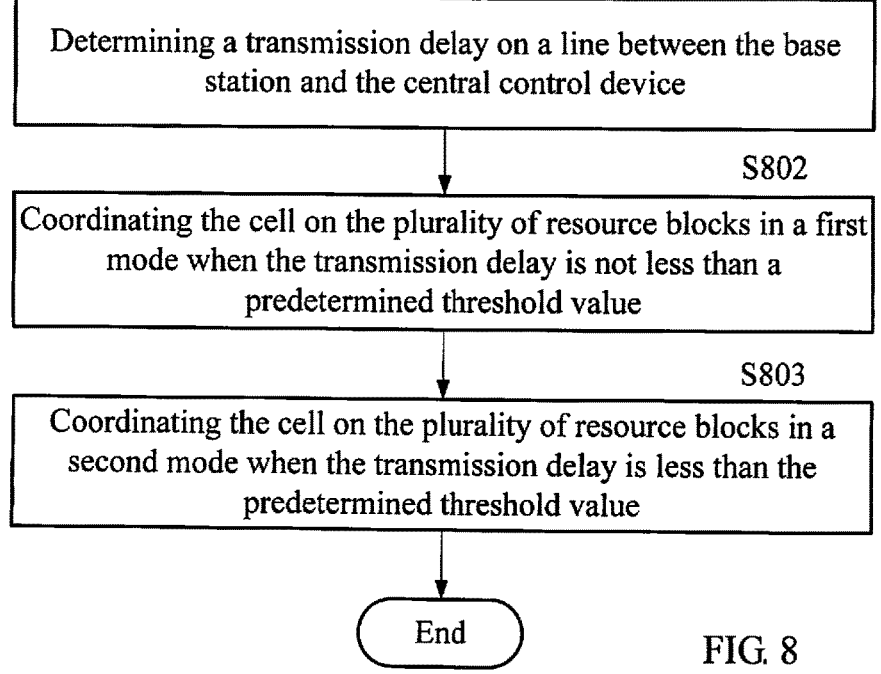
FIG. 8 shows a flowchart of a method for selecting, by a central control device, a mode of coordinating a cell on a plurality of resource blocks.

It is to be noted that the above method according to the embodiment of the present disclosure may be used independently, regardless of a magnitude of the transmission delay on the line between the base station and the central control device. Alternatively, the above method according to the embodiment of the present disclosure may be used in combination with a conventional method for coordinating a cell based on instant CSI (e.g., the method described with reference to FIG. 2 or FIG. 3), in which case a specific method for coordinating the cell may be selected according to the magnitude of the transmission delay. FIG. 8 shows a flowchart of a method for selecting, by the central control device, a mode of coordinating a cell on a plurality of resource blocks. As shown in FIG. 8, in step S801, the transmission delay on the line between the base station and the central control device is determined. When the transmission delay is not less than a predetermined threshold value, the cell is coordinated on the plurality of resource blocks in a first mode in step S802, and when the transmission delay is less than the predetermined threshold value, the cell on the plurality of resource blocks is coordinated in a second mode in step S803. The first mode may be the above mode according to the embodiment of the present disclosure, and the second mode may be a mode of determining a muting state of the cell on the plurality of resource blocks by joint scheduling based on channel state information (CSI) which is received from the base station and indicates a channel state between a user of the cell and the base station, for example, the modes described above with reference to FIG. 2 or FIG. 3.

Figure 9:
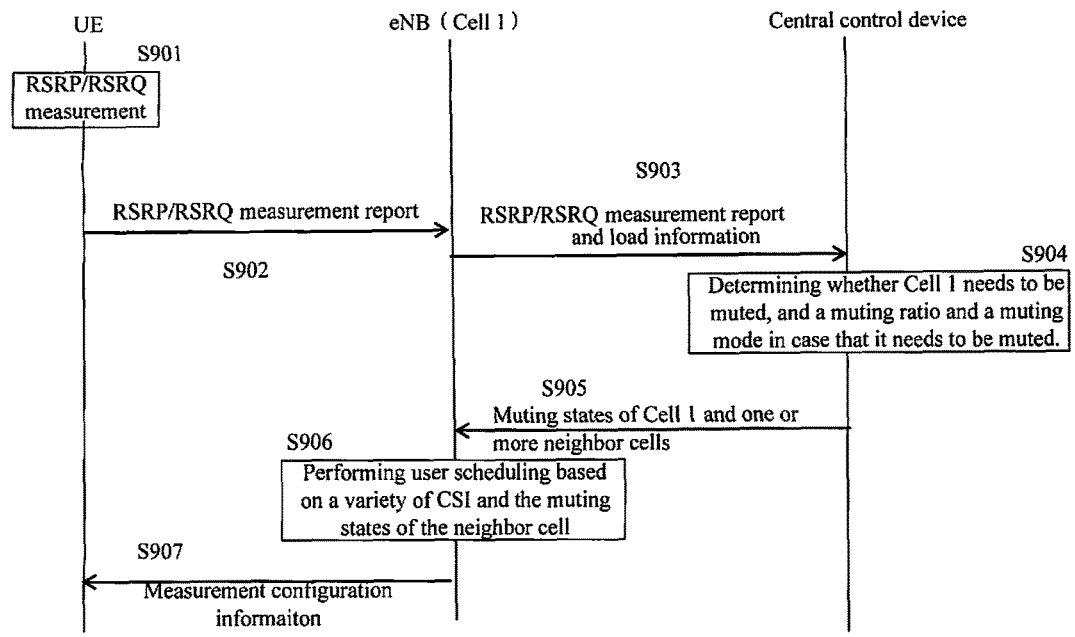
FIG. 9 shows a specific implementation example of the method for coordinating a cell according to the embodiment of the present disclosure.

With reference now to FIG. 9, a specific implementation example of the method for coordinating a cell according to the embodiment of the present disclosure is described below. Here, Cell 1 is still taken as an example for explanation. As shown in FIG. 9, a user of Cell 1 measures the RSRP or the RSRQ of the respective cells in the cooperating set in step S901, and transmits a RSRP or RSRQ measurement report to the base station of Cell 1 in step S902. In Step S903, the base station of Cell 1 transmits the above measurement report and load information of Cell 1 (e.g., the resource usage rate/amount or the number of users described above) to the central control device. In step S904, the central control device, based on the received information, determines whether Cell 1 needs to be muted on at least one resource block in the manner described above, and in a case where Cell 1 needs to be muted on the at least one resource block, determines a muting ratio and a muting mode of Cell 1. In addition, the central control device may perform similar processing on other cells, so as to determine muting ratios and muting modes of the other cells. Then, in step S905, the central control device notifies the muting mode of Cell 1 and the muting modes of the neighbor cells of Cell 1 (specifically, information indicating muting states of the neighbor cells of Cell 1 on the respective resource blocks) to Cell 1. In step S906, the base station of Cell 1 is muted or transmits data on the respective resource blocks based on the muting mode of itself notified by the central control device, and performs user scheduling based on the variety of CSI received from the user of Cell 1 and the muting modes of the neighbor cells in the manner described above. In step S907, the base station notifies measurement configuration information for measuring the channel state between the UE and the base station to the users, so that the user measures and feeds back the CSI.

Next, an apparatus for coordinating a cell on a plurality of resource blocks according to an embodiment of the present disclosure will be described with reference to FIG. 10. The apparatus may execute the coordination method described above. As described above, the resource block may be a time resource block, a frequency resource block, or a time-frequency resource block. In addition, the cell may be a small-sized cell, for example, a small cell, a micro cell, a pico cell, etc., or may be another type of cell except the small cell, for example, a macro cell, etc. The apparatus may be arranged in the central control device shown in FIG. 1 and become a part of the central control device, or may be communicatively coupled to the central control device. Since operations executed by respective components of the apparatus are substantially the same as the corresponding steps of the method described above, the apparatus is briefly described herein.

Figure 10:
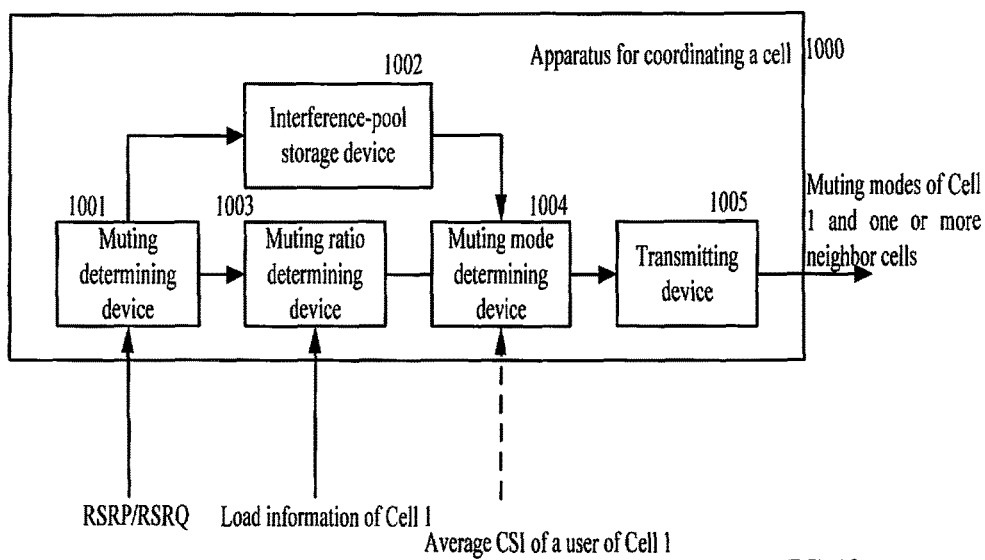
FIG. 10 shows a block diagram of an apparatus for coordinating a cell on a plurality of resource blocks according to an embodiment of the present disclosure.

As shown in FIG. 10, the apparatus 1000 for coordinating the cell comprises a muting determining device 1001, an interference-pool storage device 1002, a muting ratio determining device 1003, a muting mode determining device 1004 and a transmitting device 1005.

The muting determining device 1001 may determine whether Cell 1 needs to be muted on at least one resource block. The muting determining device 1001 may determine whether Cell 1 needs to be muted on the at least one resource block in a variety of manners. For example, the muting determining device 1001 may determine whether Cell 1 has a victim cell described above according to whether interference from Cell 1 to users of other cells in a cluster exceeds a predetermined level, so as to determine whether Cell 1 needs to be muted on the at least one resource block. Alternatively, the muting determining device 1001 may determine whether Cell 1 has the victim cell according to whether distances (or path losses) between Cell 1 and the other cells in the cluster are less than a predetermined threshold value, so as to determine whether Cell 1 needs to be muted on the at least one resource block. In both cases, the muting determining device 1001 may determine whether Cell 1 needs to be muted on the at least one resource block respectively in accordance with the method described above with respect to step S401 shown in FIG. 4, and a detailed description thereof is omitted here for simplicity.

For the other cells in the cluster, the muting determining device 1001 may similarly perform the above determination operation, to determine victim cells of the respective cells. Thus, a cell which imparts interference exceeding the predetermined level on a user of Cell 1 i.e., an interference-source cell of Cell 1, may be determined. The muting determining device 1001 may establish an interference pool for Cell 1 to record the victim cell and the interference-source cell of Cell 1. The interference pool may be implemented as a filed in any suitable format, for example, a table, etc. The interference-pool storage device 1002 may store the interference pool for use in subsequent processing. The interference-pool storage device 1002 may be implemented by using any suitable form of memory.

The muting ratio determining device 1003 may determine a ratio of the resource block on which Cell 1 is muted to the plurality of resource blocks, i.e., a muting ratio, in a case where Cell 1 needs to be muted on the at least one resource block. As described above, the muting ratio determining device 1003 may determine the muting ratio according to a load of Cell 1, so that the higher the load of Cell 1 is, the lower the muting ratio is. Here, as described above, the load of Cell 1 may be expressed by a resource usage rate or a number of users of Cell 1. A specific manner for the muting ratio determining device 1003 to determine the muting ratio is the same as that described above with reference to FIG. 4, and a detailed description thereof is omitted here for simplicity.

The muting mode determining device 1004 may receive the muting ratio determined by the muting ratio determining device 1003, and, based on the muting ratio, determine the resource block on which Cell 1 is muted among the plurality of resource blocks, i.e., a muting mode of Cell 1.

Specifically, the muting mode determining device 1004 may, in the manner described above, firstly determine a number of muted cells for each resource blocks of the plurality of resource blocks, and select a number of resource blocks corresponding to the muting ratio of Cell 1 from the plurality of resource blocks in a descending order of the numbers of muted cells for the respective resource blocks, as resource blocks on which Cell 1 is not muted, i.e., transmitting resource blocks of Cell 1, so as to determine remaining resource blocks as resource blocks on which Cell 1 is muted, i.e., muted resource blocks of Cell 1. Here, the number of muted cells for each resource block refers to a number of cells which are muted on the resource block and are included in the interference pool of Cell 1. If at least two resource blocks have the same number of muted cells in the above selection process, and it is necessary to select at least one resource block from the at least two resource blocks as a transmitting resource block of Cell 1, the muting mode determining device 1004 may select the at least one resource block from the at least two resource blocks, according to intensities of average CSI of the users of Cell 1 respectively on the at least two resource blocks. The muting mode determining device 1004 may perform the selection operation in the manner described above with reference to FIG. 4, and a detailed description thereof is omitted here.

By the above operations, the apparatus 1000 may determine muting states of Cell 1 on the respective resource blocks. By performing the above operations on each cell, coordination of all the cells may be completed.

The transmitting device 1005 notifies the determined muting mode of Cell 1 to Cell 1 to make it operate in this mode. Specifically, the transmitting device 1005 may transmit information indicating the muting states of Cell 1 on the respective resource blocks to the base station of Cell 1, so that Cell 1 is muted or transmits data on the respective resource blocks according to this information. In addition, the transmitting device 1005 may transmit information indicating muting states of neighbor cells of Cell 1 on the respective resource blocks to the base station of Cell 1 for use in its user scheduling.

As described above, on the resource blocks on which Cell 1 is not muted, the base station of Cell 1 may receive a variety of CSI fed back from a user of Cell 1, and perform user scheduling based on the variety of CSI and the muting states of the neighbor cells of Cell 1 on the respective resource blocks in the manner described above with reference to FIG. 4.

Thus, with the coordination apparatus according to the embodiment of the present disclosure, in a case where the plurality of cells are deployed, inter-cell interference may be reduced significantly, and in the meantime, even if the transmission delay on the line between the base station and the central control device is relatively large, a good cell coordination result and a good user scheduling result may be obtained, and the performance of the communication system may be improved.

The above coordination apparatus may be implemented in hardware, a software module executed by a processor, or a combination thereof. The software module may also be set in any form of storage medium, such as a Random Access Memory (RAM), a flash memory, a Read Only Memory (ROM), an Erasable and Programmable ROM (EPROM), an Electrically Erasable and Programmable ROM (EEPROM), a register, a hard disk, a removable disk, a CD-ROM or the like. The storage medium is connected to the processor so that the processor may read/write information from/to the storage medium. In addition, the storage medium may be integrated into the processor. Moreover, the storage medium and the processor may be arranged in an application specific integrated circuit (ASIC). The ASIC may be provided in the above control device or the wireless base station eNB. Moreover, the storage medium and the processor may be provided as discrete components within the above control device or the wireless base station eNB.

Although exemplary embodiments of the present disclosure have been shown and described, it is to be understood by those skilled in the art that various changes in form and detail may be made to these exemplary embodiments without departing from the scope and spirit of the present invention defined by the following claims and equivalents thereof.

What is claimed is:

1. A method for coordinating a cell on a plurality of resource blocks by a central control device of a wireless communication system, the cell forming a cluster with at least one other cell, the method comprising:
   determining by the central control device whether the cell needs to be muted on at least one resource block;
   determining by the central control device a ratio of the resource block on which the cell is muted to the plurality of resource blocks, in a case where the cell needs to be muted on the at least one resource block;
   determining by the central control device, based on the ratio, the resource block on which the cell is muted among the plurality of resource blocks, the resource block being a time resource block, a frequency resource block or a time-frequency resource block; and
   transmitting by the central control device information indicating muting states of the cell on the respective resource blocks and information indicating muting states of neighbor cells of the cell on the respective resource blocks to a base station corresponding to the cell.

2. The method of claim 1, wherein the determining by the central control device whether the cell needs to be muted on at least one resource block includes:
   determining by the central control device whether the cell needs to be muted on at least one resource block, according to whether interference from the cell to a user of the other cell in the cluster exceeds a predetermined level.

3. The method of claim 1, wherein the determining by the central control device whether the cell needs to be muted on at least one resource block includes:
   determining by the central control device whether the cell needs to be muted on the at least one resource block, according to whether a distance between the cell and the other cell in the cluster is less than a predetermined threshold value.

4. The method of claim 1, wherein the determining by the central control device a ratio of the resource block on which the cell is muted to the plurality of resource blocks includes:
   determining by the central control device the ratio according to a load of the cell, where the higher the load of the cell is, the lower the ratio is.

5. The method of claim 4, wherein the load of the cell is expressed by a resource usage rate or a number of users of the cell.

6. The method of claim 1, wherein the determining by the central control device, based on the ratio, a resource block on which the cell is muted among the plurality of resource blocks includes:
   determining by the central control device a number of muted cells for each resource block in the plurality of resource blocks, the number of muted cells for each resource block referring to a number of cells which are muted on the resource block and are included in an interference pool of the cell, the interference pool of the cell including an interfering cell which imparts interference on the cell and a victim cell which suffers interference from the cell; and selecting by the central control device a number of resource blocks corresponding to the ratio from the plurality of resource blocks in a descending order of the numbers of muted cells for the respective resource blocks, as resource blocks on which the cell is not muted, thereby determining a remaining resource block as the resource block on which the cell is muted.

7. The method of claim 6, further comprising:
when at least two resource blocks have the same number of muted cells, selecting by the central control device at least one resource block from the at least two resource blocks according to intensities of average channel state information of a user of the cell respectively on the at least two resource blocks, as a resource block on which the cell is not muted.

8. The method of claim 1, wherein on a resource block on which the cell is not muted, the base station performs user scheduling based on a variety of channel state information fed back from a user of the cell and the muting states of the neighbor cells of the cell on the respective resource blocks.

9. An apparatus for coordinating a cell on a plurality of resource blocks, the cell forming a cluster with at least one other cell, the apparatus comprising:
a muting determining device, configured to determine whether the cell needs to be muted on at least one resource block;
a muting ratio determining device, configured to determine a ratio of the resource block on which the cell is muted to the plurality of resource blocks, in a case where the cell needs to be muted on the at least one resource block;
a muting mode determining device, configured to determine, based on the ratio, the resource block on which the cell is muted among the plurality of resource blocks, the resource block being a time resource block, a frequency resource block or a time-frequency resource block; and
a transmitting device, configured to transmit information indicating muting states of the cell on the respective resource blocks and information indicating muting states of neighbor cells of the cell on the respective resource blocks to a base station corresponding to the cell.

10. The apparatus of claim 9, wherein the muting determining device determines whether the cell needs to be muted on the at least one resource block, according to whether interference from the cell to a user of the other cell in the cluster exceeds a predetermined level.

11. The apparatus of claim 9, wherein the muting determining device determines whether the cell needs to be muted on the at least one resource block, according to whether a distance between the cell and the other cell in the cluster is less than a predetermined threshold value.

12. The apparatus of claim 9, wherein the muting ratio determining device determines the ratio according to a load of the cell, where the higher the load of the cell is, the lower the ratio is.

13. The apparatus of claim 12, wherein the load of the cell is expressed by a resource usage rate or a number of users of the cell.

14. The apparatus of claim 9, wherein the muting mode determining device determines a number of muted cells for each resource block in the plurality of resource blocks, and selects a number of resource blocks corresponding to the ratio from the plurality of resource blocks in a descending order of the numbers of muted cells for the respective resource blocks, as resource blocks on which the cell is not muted, thereby determines a remaining resource block as the resource block on which the cell is muted, the number of muted cells on each resource block referring to a number of cells which are muted on the resource block and are included in an interference pool of the cell, the interference pool of the cell including an interfering cell which imparts interference on the cell and a victim cell which suffers interference from the cell.

15. The apparatus of claim 14, wherein when at least two resource blocks have the same number of muted cells, the muting mode determining device selects at least one resource block from the at least two resource blocks according to intensities of average channel state information of a user of the cell respectively on the at least two resource blocks, as a resource block on which the cell is not muted.

16. The apparatus of claim 15, wherein the apparatus is included in a central control device, and the average channel state information is reported from a base station to the central control device.

17. The apparatus of claim 9, wherein on a resource block on which the cell is not muted, the base station performs user scheduling based on a variety of channel state information fed back from a user of the cell and the muting states of the neighbor cells of the cell on the respective resource blocks.

18. A method for selecting, by a central control device, a mode of coordinating a cell on a plurality of resource blocks in a communication system including a base station and the central control device, comprising:
determining a transmission delay on a line between the base station and the central control device; and
coordinating the cell on the plurality of resource blocks in a first mode when the transmission delay is not less than a predetermined threshold value, and coordinating the cell on the plurality of resource blocks in a second mode when the transmission delay is less than the predetermined threshold value,
wherein in the first mode, it is determined whether the cell needs to be muted on at least one resource block, a ratio of the resource block on which the cell is muted to the plurality of resource blocks is determined in a case where the cell needs to be muted on the at least one resource block, and the resource block on which the cell is muted among the plurality of resource blocks is determined based on the ratio, and in the second mode, muting states of the cell on the plurality of resource blocks are determined by joint scheduling based on channel state information which is received from the base station and indicates a channel state between a user of the cell and the base station.

* * * * *